(12) United States Patent
Hirota et al.

(10) Patent No.: US 11,807,299 B2
(45) Date of Patent: Nov. 7, 2023

(54) DISPLAY DEVICE FOR A VEHICLE

(71) Applicant: TOYOTA JIDOSHA KABUSHIKI KAISHA, Toyota (JP)

(72) Inventors: Takahiro Hirota, Nukata-gun (JP); Koji Aikawa, Nagoya (JP); Shigeto Muramatu, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/940,062

(22) Filed: Sep. 8, 2022

(65) Prior Publication Data

US 2023/0001985 A1 Jan. 5, 2023

Related U.S. Application Data

(63) Continuation of application No. 16/502,118, filed on Jul. 3, 2019, now Pat. No. 11,479,299.

(30) Foreign Application Priority Data

Jul. 26, 2018 (JP) .................................. 2018-140600

(51) Int. Cl.
| | |
|---|---|
| *G06F 17/00* | (2019.01) |
| *B60R 11/04* | (2006.01) |
| *G09G 5/38* | (2006.01) |
| *B62D 15/02* | (2006.01) |
| *B60K 35/00* | (2006.01) |

(Continued)

(52) U.S. Cl.
CPC ............ *B62D 15/029* (2013.01); *B60K 35/00* (2013.01); *B60R 1/00* (2013.01); *G02B 27/0101* (2013.01); *G02B 27/0179* (2013.01); *B60K 2370/1529* (2019.05); *B60K 2370/162* (2019.05); *B60K 2370/1868* (2019.05); *B60K 2370/52* (2019.05); *B60R 2300/205* (2013.01); *B60R 2300/207* (2013.01); *B60R 2300/8086* (2013.01);

(Continued)

(58) Field of Classification Search
CPC ................................................ B60R 2300/205
See application file for complete search history.

(56) References Cited

U.S. PATENT DOCUMENTS

| | | | |
|---|---|---|---|
| 2013/0289875 A1 | 10/2013 | Kumon | |
| 2014/0098196 A1* | 4/2014 | Guan | ................... H04N 13/239 |
| | | | 348/148 |

(Continued)

FOREIGN PATENT DOCUMENTS

| | | | |
|---|---|---|---|
| JP | H09-113301 A | 5/1997 | |
| JP | 2006-040223 A | 2/2006 | |

(Continued)

OTHER PUBLICATIONS

Mar. 16, 2022 Office Action issued in U.S. Appl. No. 16/502,118.
Jun. 28, 2022 Notice of Allowance issued in U.S. Appl. No. 16/502,118.

*Primary Examiner* — Nan-Ying Yang
(74) *Attorney, Agent, or Firm* — Oliff PLC

(57) ABSTRACT

There is provided a display device for a vehicle, the display device including: a display unit that is visible to an occupant of a vehicle; a memory; and a processor that is connected to the memory, the processor changing a content image displayed on the display unit so as to be displayed in the same direction as a direction in which a travel path of the vehicle curves.

11 Claims, 8 Drawing Sheets

(51) Int. Cl.
*B60R 1/00* (2022.01)
*G02B 27/01* (2006.01)
(52) U.S. Cl.
CPC ............... *G02B 2027/014* (2013.01); *G02B 2027/0141* (2013.01); *G02B 2027/0183* (2013.01)

(56) References Cited

U.S. PATENT DOCUMENTS

| | | | |
|---|---|---|---|
| 2016/0182863 A1* | 6/2016 | Watanabe | B60R 1/00 348/148 |
| 2017/0011709 A1 | 1/2017 | Kuwabara et al. | |
| 2018/0011314 A1* | 1/2018 | Quiroz de la Mora | B60K 35/00 |
| 2018/0023970 A1 | 1/2018 | Iguchi | |
| 2018/0091085 A1* | 3/2018 | Tamagaki | B60W 30/06 |
| 2018/0218603 A1* | 8/2018 | Torii | B60K 35/00 |
| 2019/0035127 A1 | 1/2019 | Choi | |

FOREIGN PATENT DOCUMENTS

| | | |
|---|---|---|
| JP | 2006-284458 A | 10/2006 |
| JP | 2007-121031 A | 5/2007 |
| JP | 2016-145783 A | 8/2016 |
| JP | 2017-202721 A | 11/2017 |
| WO | 2012/090325 A1 | 7/2012 |
| WO | 2015/136874 A1 | 9/2015 |

\* cited by examiner

DISPLAY DEVICE FOR A VEHICLE

CROSS-REFERENCE TO RELATED APPLICATIONS

This is a continuation of U.S. patent application Ser. No. 16/502,118 filed Jul. 3, 2019 (now U.S. Pat. No. 11,479,299), which is based on and claims priority under 35 USC 119 from Japanese Patent Application No. 2018-140600 filed in Japan on Jul. 26, 2018. The disclosure of each of the above-identified prior applications is incorporated by reference herein in its entirety.

BACKGROUND

Technical Field

The present disclosure relates to a display device for a vehicle.

Related Art

Japanese Patent Application Laid-Open (JP-A) No. 2006-40223 discloses a vehicle head-up display device including a control means that reads digital map data based on a current position of a vehicle detected by a position detection means, and displays the shape of the road ahead of the vehicle on a display section.

In this device, the control means emphasizes display of curved portions having a predetermined curvature or greater in the shape of the road displayed on the display section, in order for a driver to easily ascertain the shape of the road ahead of the vehicle.

However, the device of JP-A No. 2006-40223 simply displays the digital map on the display section, and so there is room for improvement so as to enable the driver to quickly and accurately ascertain vehicle travel conditions.

SUMMARY

An object of the present disclosure is to obtain a display device for a vehicle capable of communicating vehicle travel conditions to an occupant in a manner that is easy to understand.

A display device for a vehicle of a first aspect includes a display unit that is visible to an occupant of a vehicle, and a controller that changes a content image displayed on the display unit so as to be displayed in the same direction as a direction in which a travel path of the vehicle curves.

The "content" is information relating to the vehicle, and includes information relating to vehicle states, information regarding the vehicle surroundings, information relating to the travel route, and the like. For example, information relating to vehicle states includes a vehicle speed, engine revolution speed, detection status of a vehicle traveling in front that is being followed, and the like. Information regarding the vehicle surroundings includes, for example, a distance to the vehicle traveling in front, the temperature outside the vehicle, the weather, and the like. Information relating to the travel route includes, for example, junction guidance display (Turn by Turn display), traffic congestion information, and the like, and is coordinated with a car navigation system.

In the display device of the first aspect, vehicle travel conditions can be communicated to an occupant in a manner that is easy to understand by using the content image to express the progress of the vehicle on the display unit when about to travel through a curve on the travel path, and when traveling through the curve.

A display device for a vehicle of a second aspect is the first aspect, wherein the controller makes a change to the content image according to a steering angle of a steering wheel.

The display device of the second aspect enables a change in the travel path to be ascertained using a simpler configuration than in cases in which the curvature of a curve is detected using a camera or the like.

A display device for a vehicle of a third aspect is the first aspect or the second aspect, wherein the content is information relating to the vehicle, and the controller shifts an image of the information so as to be displayed at the same side of the display unit to which the travel path curves.

The display device of the third aspect shifts the content image in the same direction as the direction in which the travel path curves, enabling the gaze of the occupant to be guided in the direction in which the travel path curves.

A display device for a vehicle of a fourth aspect is the first aspect or the second aspect, wherein the content image is a pair of lines simulating the travel path, and the controller causes an upper portion of the pair of lines to curve in the same direction as the direction in which the travel path curves.

The "pair of lines simulating the travel path" are, for example, lines simulating white lines or a curb on each side in the vehicle width direction. The "pair of lines" are not limited to a pair of unbroken lines, and may be lines of any continuation of line segments such as two sets of double lines or a pair of dotted lines. The display device of the fourth aspect enables an occupant to easily recognize that they are passing through a curve on the travel path.

A display device for a vehicle of a fifth aspect is the fourth aspect, wherein the display unit includes a first display unit that is provided at a meter display, and a second display unit that is provided at a projection surface of a head-up display, and that is above and adjacent to the first display unit in a line of sight of the occupant. The controller displays the pair of lines so as to be continuous from the first display unit to the second display unit.

The display device of the fifth aspect enables an occupant to clearly recognize that they are passing through a curve by displaying lines simulating the travel path over a wide range on the display units.

A display device for a vehicle of a sixth aspect is the fourth aspect or the fifth aspect, wherein the controller causes display of the lines on the display unit in a case in which the vehicle is coming into a curve, and clears the lines from the display unit after the vehicle has passed through the curve.

The display device of the sixth aspect enables the gaze of the occupant to be guided when passing through a curve, while enabling other valuable information to be presented to the occupant when not on a curve.

A display device for a vehicle of a seventh aspect is the fourth aspect or the fifth aspect, wherein the controller causes display of the lines on the display unit in response to activation of a cruise control function of the vehicle.

The display device of the seventh aspect enables an occupant to be informed that the vehicle has detected a curve.

The present disclosure is capable of communicating vehicle travel conditions to an occupant in a manner that is easy to understand.

BRIEF DESCRIPTION OF THE DRAWINGS

Exemplary embodiments of the present invention will be described in detail based on the following figures, wherein.

DETAILED DESCRIPTION

Explanation follows regarding a display device 10 serving as a display device for a vehicle according to exemplary embodiments of the present disclosure, with reference to FIG. 1 to FIG. 4. Note that in the context of FIG. 1, FIG. 3, and FIG. 4, "in front" refers to being in front when looking toward the front of a vehicle from the vehicle rear.

First Exemplary Embodiment

Figure 1:
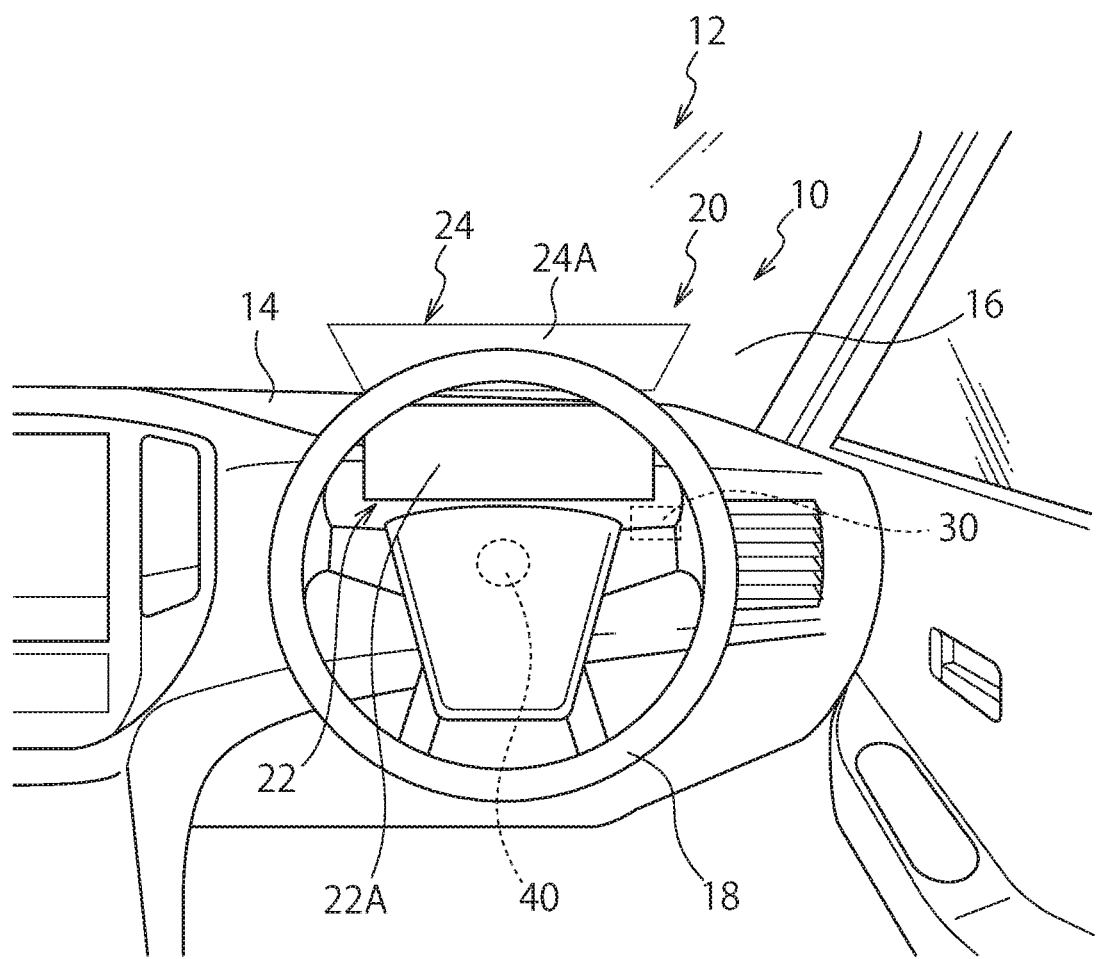
FIG. 1 is a face-on view of a display unit provided on a driving seat side, the display unit configuring a display device for a vehicle according to a first exemplary embodiment.

FIG. 1 illustrates a display device 10 of a first exemplary embodiment. As illustrated in FIG. 1, the display device 10 of the present exemplary embodiment includes a display unit 20 provided in front of an occupant in a driving seat of a vehicle 12, and a control device 30 that controls content images on the display unit 20.

The display unit 20 includes a liquid crystal display 22A serving as a first display unit provided at a meter display 22, and a projection screen 24A serving as a second display unit provided at a projection screen of a head-up display 24. The projection screen 24A displays an image adjacent to and at the vehicle upper side of the liquid crystal display 22A, in a line of sight of the occupant.

To explain further, in the vehicle 12 of the present exemplary embodiment, the meter display 22 is provided in front of a dashboard 14. The liquid crystal display 22A is provided in front of the meter display 22. In the vehicle 12 of the present exemplary embodiment, the head-up display 24 is provided adjacent to and at the vehicle front side of the meter display 22 on the dashboard 14. The head-up display 24 includes a projector 24B inside the dashboard 14. An image is projected from the projector 24B onto the projection screen 24A set at a front window 16, this being a projection surface. Note that the projection surface of the head-up display 24 is not limited to the front window 16, and a combiner (reflective panel) provided at the dashboard 14 may serve as the projection surface.

Figure 2:
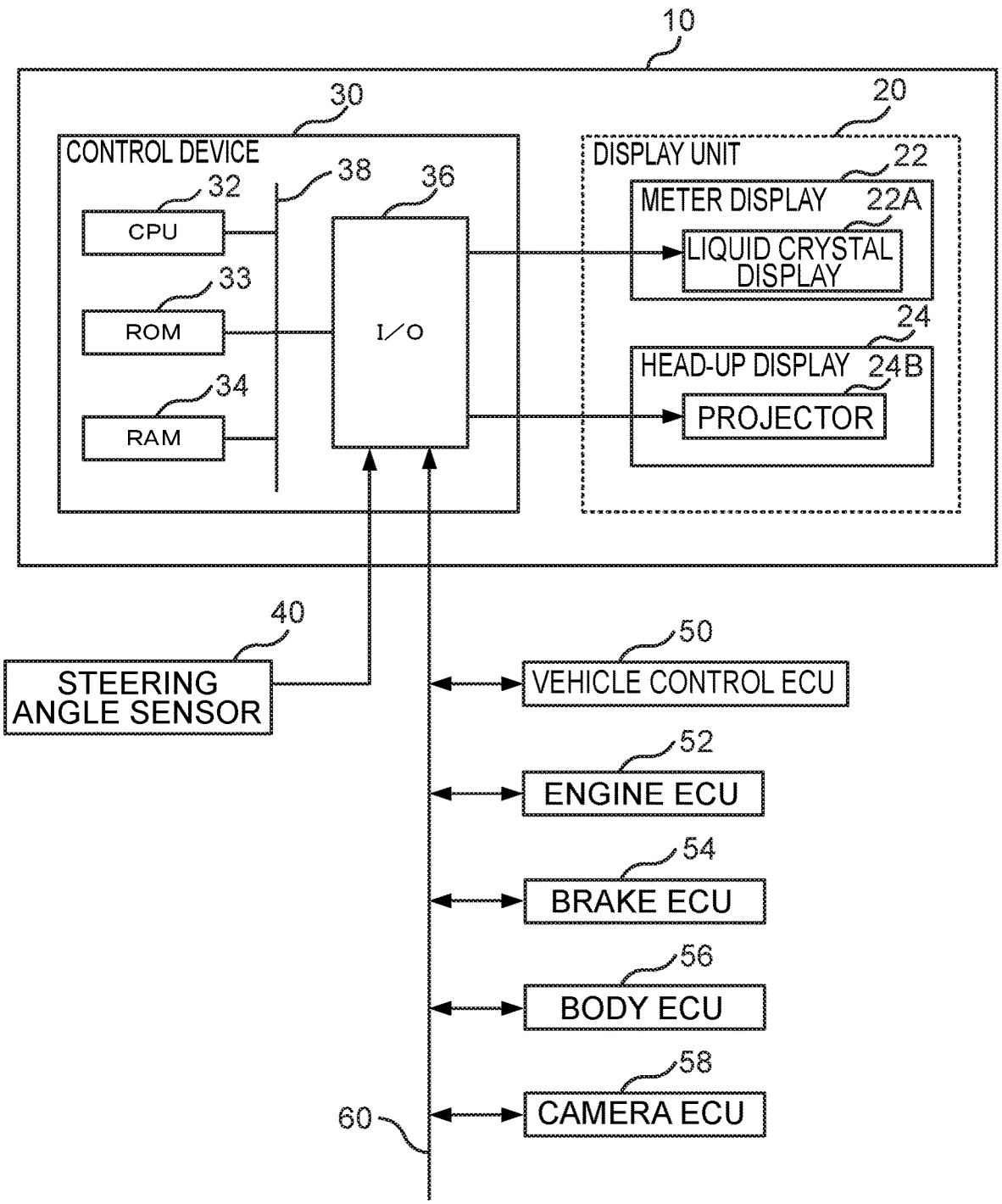
FIG. 2 is a block diagram illustrating configuration of a display device for a vehicle according to the first exemplary embodiment.

The control device 30 is provided inside the dashboard 14 so as to be near to the display unit 20. As illustrated in FIG. 2, hardware of the control device 30 includes a Central Processing Unit (CPU) 32 serving as an example of a processor, Read Only Memory (ROM) 33, Random Access Memory (RAM) 34, and an input/output interface (I/O) 36. The CPU 32, the ROM 33, the RAM 34, and the I/O 36 are connected together through a bus 38. Note that the control device 30 may also include non-volatile memory such as a Hard Disk Drive (HDD) or a Solid State Drive (SSD) in addition to the ROM 33, or in place of the ROM 33.

A display program for executing display processing in the CPU 32, and image data and the like for display on the display unit 20, are stored in the ROM 33. The CPU 32 reads the display program from the ROM 33 and expands the display program in the RAM 34. The CPU 32 operates as a controller by loading and executing the display program. Note that the display program may be stored in a non-transitory recording medium such as a Digital Versatile Disc (DVD), read using a recording medium reading device, and expanded in the RAM 34.

The meter display 22 and the head-up display 24 configuring the display unit 20 are connected to the I/O 36.

A steering angle sensor 40 and various Electronic Control Units (ECUs) are also connected to the I/O 36. The ECUs connected to the control device 30 include a vehicle control ECU 50, an engine ECU 52, a brake ECU 54, a body ECU 56, and a camera ECU 58. These ECUs are connected through a controller area network (CAN) 60. Note that the connection method is not limited thereto, and the various ECUs may for example be connected through a gateway ECU.

The steering angle sensor 40 is provided on a shaft of a steering wheel 18 (see FIG. 1), and is a sensor for detecting a steering angle of the steering wheel 18. A rotation angle detected by the steering angle sensor 40 is transmitted to the I/O 36 as the steering angle.

The vehicle control ECU 50 is an ECU that controls for example cruise control, Vehicle Stability Control (VSC), and a lane-keep system. The vehicle 12 of the present exemplary embodiment includes a cruise control function, and the vehicle control ECU 50 coordinates with other ECUs, such as the engine ECU 52, the brake ECU 54, and the camera ECU 58 such that the vehicle 12 travels at a set speed, or follows a vehicle traveling in front.

The engine ECU 52 is an ECU that controls engine output. For example, when the cruise control function has been activated, the engine ECU 52 controls the engine output such that the vehicle 12 travels at a preset speed, or such that the vehicle 12 maintains a fixed distance to a vehicle traveling in front. The engine ECU 52 acquires the speed of the vehicle 12 and the engine revolution speed in order to control the engine. In the present exemplary embodiment, the vehicle speed and engine revolution speed are transmitted from the engine ECU 52 to the I/O 36.

The brake ECU 54 is an ECU that controls braking. For example, when the cruise control function has been activated, the brake ECU 54 controls braking of the wheels such that vehicle 12 travels at a preset speed, or such that a fixed distance is maintained between the vehicle 12 and a vehicle traveling in front.

The body ECU 56 is an ECU that controls various lights including headlights, power windows, and so on. For example, in cases in which the vehicle 12 is installed with automatic lighting that is automatically switched on or off according to the light intensity outside the vehicle, the body ECU 56 transmits an operational state of the headlights to the I/O 36.

The camera ECU 58 has a function to detect a situation in the surroundings of the vehicle 12 based on information acquired from various sensors, such as a camera, millimeter-wave radar, or Light Detection and Ranging/Laser Imaging Detection and Ranging (LIDAR) provided at an outer section of the vehicle 12. The camera ECU 58 detects a vehicle traveling in front of the vehicle 12 based on the information acquired from the various sensors, thereby enabling the vehicle control ECU 50 to make the vehicle 12 follow the vehicle traveling in front while maintaining a fixed distance based on the detected information. The camera ECU 58 transmits detection information regarding the vehicle traveling in front and the situation in the surroundings of the vehicle 12 to the I/O 36.

The display device 10 configured as described above operates as described below.

Figure 3A:
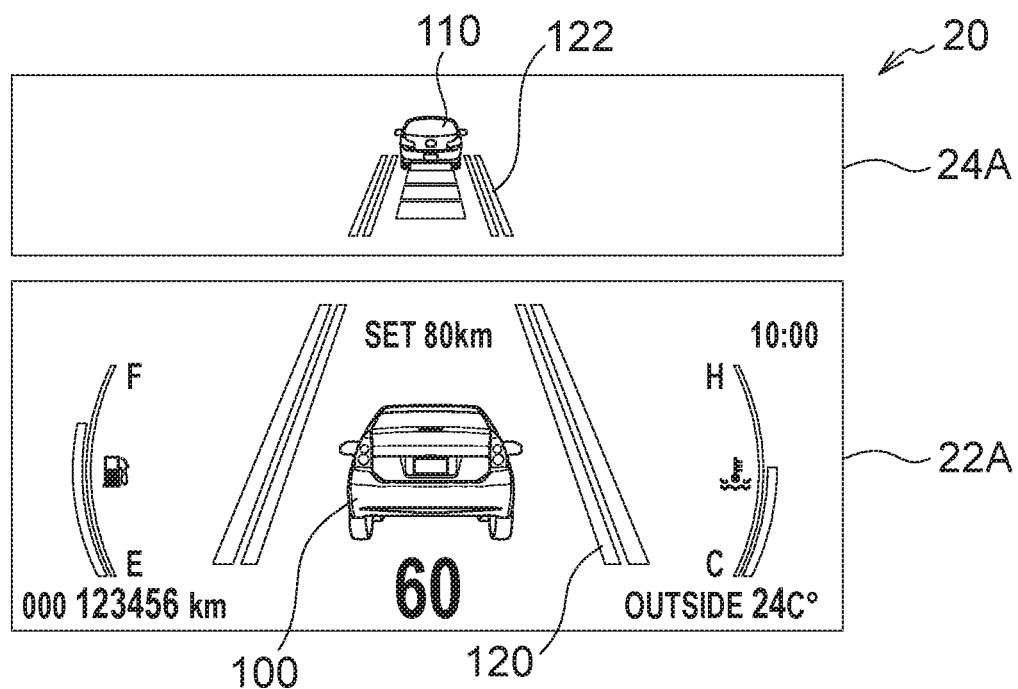
FIG. 3A is a diagram illustrating images displayed on a display unit of a display device for a vehicle according to the first exemplary embodiment when passing through a curve, before content images have been changed.
Figure 3B:
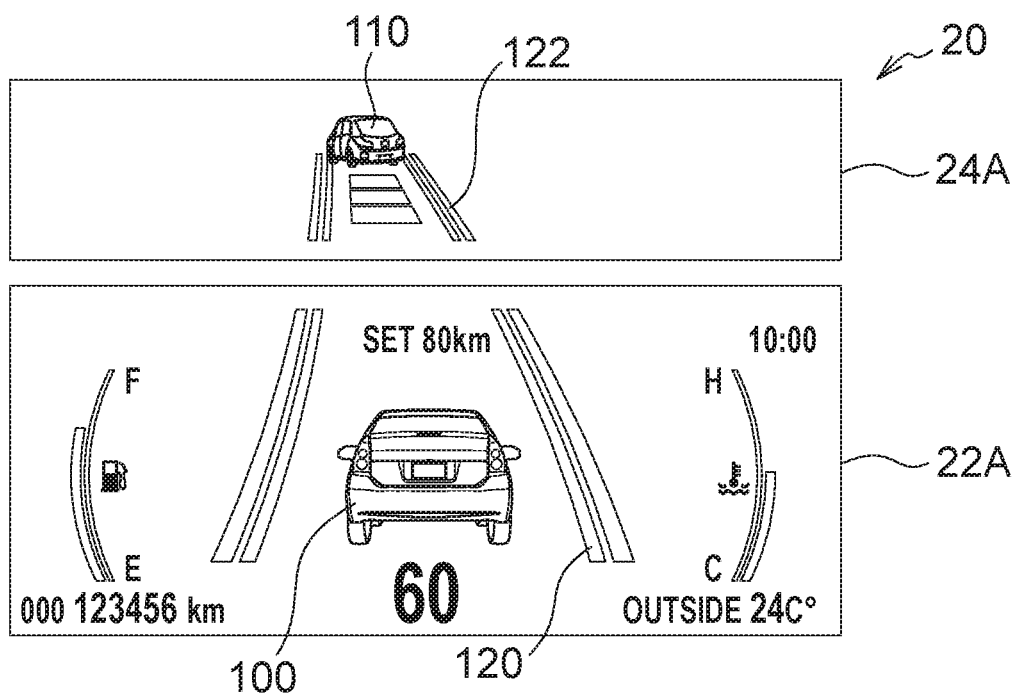
FIG. 3B is a diagram illustrating images displayed on a display unit of a display device for a vehicle according to the first exemplary embodiment when passing through a curve, while content images are being changed.
Figure 3C:
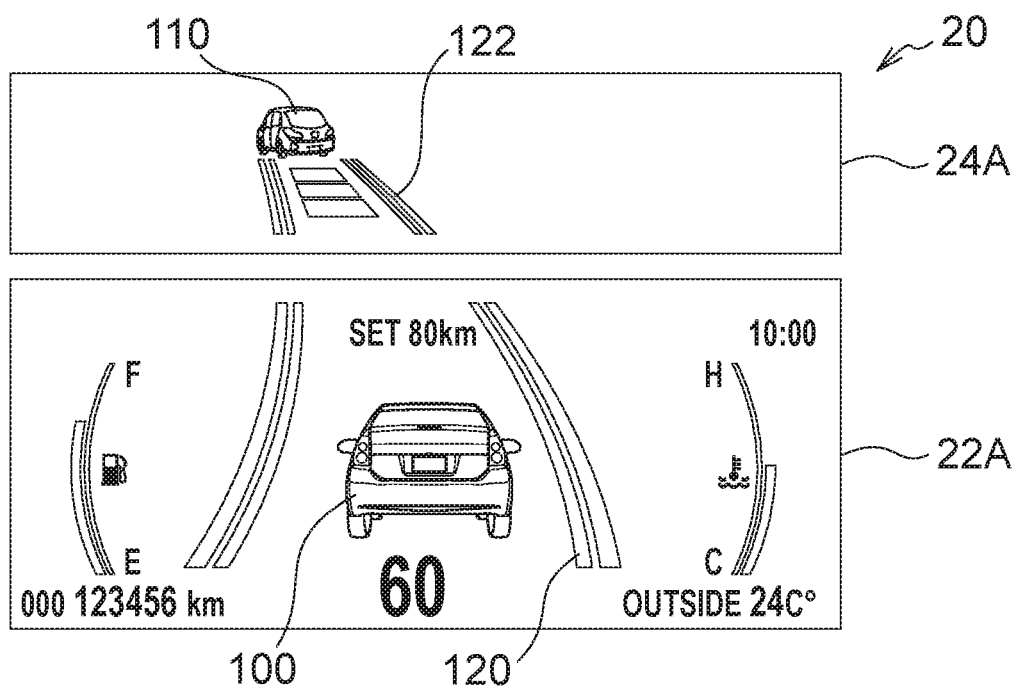
FIG. 3C is a diagram illustrating images displayed on a display unit of a display device for a vehicle according to the first exemplary embodiment when passing through a curve, after content images have been changed.

As illustrated in FIG. 3A to FIG. 3C, in the display unit 20 of the present exemplary embodiment, the liquid crystal display 22A is positioned at the vehicle lower side, and the projection screen 24A is positioned adjacent to and at the vehicle upper side of the liquid crystal display 22A, in the line of sight of an occupant seated in the driving seat.

FIG. 3A to FIG. 3C illustrate examples of states of the display unit 20 when following a vehicle traveling in front in a state in which the cruise control function has been activated. As illustrated in FIG. 3A, a vehicle image 100 representing the vehicle 12 and two sets of double lines 120 simulating a travel path are displayed on the liquid crystal screen 22A. The double lines 120 on the liquid crystal screen 22A use perspective to illustrate the travel path, such that the left and right double lines 120 on the liquid crystal screen 22A approach each other on progression upward, namely, as the travel path extends into the distance.

A vehicle-in-front image 110 representing a vehicle traveling in front and two sets of double lines 122 simulating the travel path are displayed on the projection screen 24A. The double lines 122 on the projection screen 24A also use perspective to illustrate the travel path, such that the left and right double lines 122 on the projection screen 24A approach each other on progression upward, namely, as the travel path extends into the distance. The double lines 120 and the double lines 122 are displayed as a continuation from the liquid crystal screen 22A to the projection screen 24A. Thus, the occupant interprets the images on the display unit 20 as the vehicle image 100 following the vehicle-in-front image 110 on a single travel path. In the present exemplary embodiment, the vehicle-in-front image 110, the double lines 120, and the double lines 122 correspond to content images. The double lines 120 and the double lines 122 also correspond to lines.

Note that when the vehicle 12 starts to enter a curve toward the left, the vehicle-in-front image 110, the double lines 120, and the double lines 122 displayed on the display unit 20 by the CPU 32 are changed according to the steering angle detected by the steering angle sensor 40. As illustrated in FIG. 3B, the double lines 120 are displayed on the liquid crystal screen 22A in a state curving toward the left side on progression upward. The double lines 122 are displayed on the projection screen 24A in a state curving further to the left side on progression upward than the double lines 120, and the vehicle-in-front image 110 is displayed on the projection screen 24A in a state positioned between the two sets of double lines 122 and facing toward the left.

FIG. 3C illustrates a state of the display unit 20 when the vehicle 12 is traveling around the curve, namely, when the steering angle of the steering wheel 18 of the vehicle 12 is greater than when entering the curve. The vehicle-in-front image 110, double lines 120, and double lines 122 displayed on the display unit 20 by the CPU 32 have been further changed compared to when entering the curve, according to the steering angle detected by the steering angle sensor 40. As illustrated in FIG. 3C, the double lines 122 are displayed on the liquid crystal screen 22A in a state curving further toward the left side on progression upward. The double lines 122 are displayed on the projection screen 24A in a state curving further toward the left side on progression upward than the double lines 120, and the vehicle-in-front image 110 is displayed in a state positioned between the two sets of double lines 122 and facing even further toward the left.

Note that the ROM 33 of the present exemplary embodiment stores thirty-two patterns of images for each of the vehicle-in-front image 110, the double lines 120, and the double lines 122. Namely, the vehicle-in-front image 110, the double lines 120, and the double lines 122 displayed on the respective displays of the display unit 20 are changed in thirty-two increments according to the steering angle of the steering wheel 18. The changes to the vehicle-in-front image 110, the double lines 120, and the double lines 122 are performed by animation. Namely, the CPU 32 smoothly changes the images of the vehicle-in-front image 110, the double lines 120, and the double lines 122.

Second Exemplary Embodiment

Figure 4A:
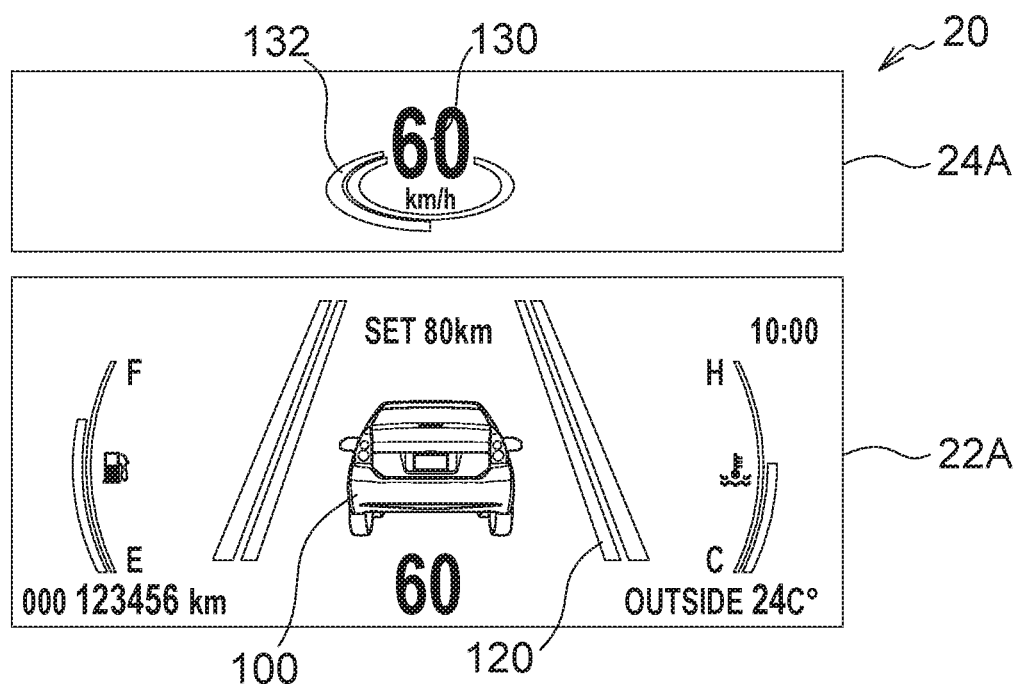
FIG. 4A is a diagram illustrating images displayed on a display unit of a display device for a vehicle according to a second exemplary embodiment when passing through a curve, before content images have been changed.

A display on the projection screen 24A in a state in which the cruise control function has been activated in a second exemplary embodiment differs from that in the first exemplary embodiment. As illustrated in FIG. 4A, the vehicle image 100 representing the vehicle 12 and the two sets of double lines 120 simulating the travel path are displayed on the liquid crystal screen 22A of the present exemplary embodiment similarly to in the first exemplary embodiment. Moreover, a vehicle speed image 130 representing the speed of the vehicle 12 is displayed on the projection screen 24A, and a level image 132 representing a vehicle speed level is displayed around the vehicle speed image 130. In the present exemplary embodiment, the double lines 120, the vehicle speed image 130, and the level image 132 correspond to content images.

Figure 4B:
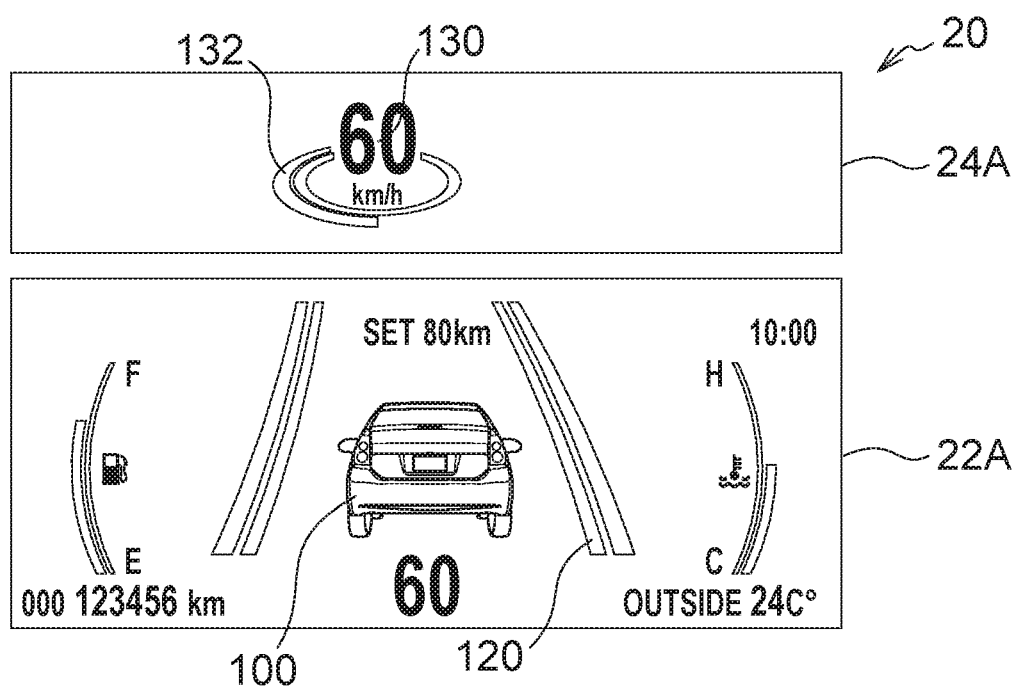
FIG. 4B is a diagram illustrating images displayed on a display unit of a display device for a vehicle according to the second exemplary embodiment when passing through a curve, while content images are being changed.

Note that when the vehicle 12 starts to enter a curve toward the left, the double lines 120, vehicle speed image 130, and level image 132 displayed on the display unit 20 by the CPU 32 are changed according to the steering angle detected by the steering angle sensor 40. As illustrated in FIG. 4B, the double lines 120 are displayed on the liquid crystal screen 22A in a state curving toward the left side on progression upward. The vehicle speed image 130 and the level image 132 are displayed on the projection screen 24A in a state shifted toward the left side.

Figure 4C:
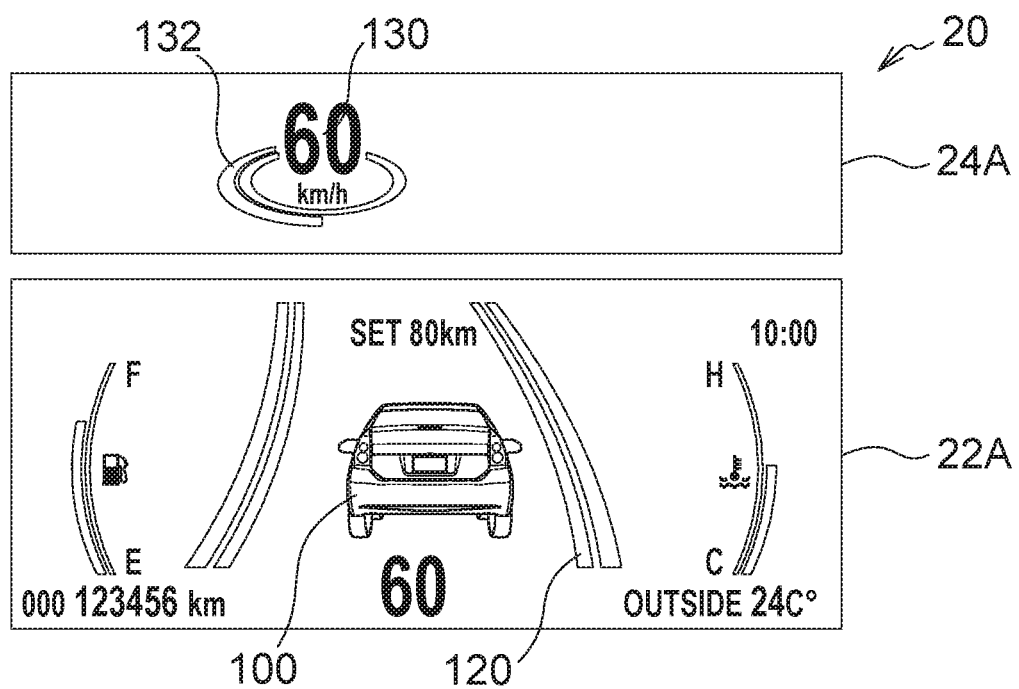
FIG. 4C is a diagram illustrating images displayed on a display unit of a display device for a vehicle according to the second exemplary embodiment when passing through a curve, after content images have been changed.

FIG. 4C illustrates a state of the display unit 20 when the vehicle 12 is traveling around the curve, namely, when the steering angle of the steering wheel 18 of the vehicle 12 is greater than when entering the curve. In such cases, the double lines 120, vehicle speed image 130, and level image 132 displayed on the display unit 20 by the CPU 32 have been further changed compared to when entering the curve, according to the steering angle detected by the steering angle sensor 40. As illustrated in FIG. 4C, the double lines 120 are displayed on the liquid crystal screen 22A in a state curving further toward the left side on progression upward. The vehicle speed image 130 and the level image 132 are displayed on the projection screen 24A in a state shifted further toward the left.

Note that in the present exemplary embodiment, the double lines 120 displayed on the liquid crystal screen 22A are changed in thirty-two increments according to the steering angle of the steering wheel 18. The vehicle speed image 130, and the level image 132 displayed on the projection screen 24A are also shifted in thirty-two increments according to the steering angle of the steering wheel 18. The changes to the double lines 120, the vehicle speed image 130, and the level image 132 are performed by animation. Namely, the CPU 32 smoothly changes the images of the double lines 120, the vehicle speed image 130, and the level image 132.

Operation and Advantageous Effects

The operation and advantageous effects of the display device 10 of each of the above exemplary embodiments are as described below.

In the first exemplary embodiment, the vehicle-in-front image 110 representing that the vehicle traveling in front is being followed, and the double lines 120 and the double lines 122 simulating the travel path, are displayed on the display unit 20 as content images. In the second exemplary embodiment, the double lines 120 simulating the travel path, the vehicle speed image 130 representing the speed of the vehicle 12, and the level image 132 representing the vehicle speed level are displayed on the display unit 20 as content images. A feature of each of these exemplary embodiments is that the content images are changed to be in the same direction as the direction in which the travel path of the vehicle 12 curves.

In the display device 10 of each of these exemplary embodiments, travel conditions of the vehicle 12 can be communicated in a manner that is easy to understand by using the content images to express the progress of the vehicle 12 on the display unit 20 when about to travel through a curve on the travel path, and when traveling through the curve.

Note that in the display device 10 of each of these exemplary embodiments, the CPU 32 changes the content images displayed on the display unit 20 according to the steering angle of the steering wheel 18. The display device 10 of each of these exemplary embodiments enables a change in the travel path to be ascertained using a simpler configuration than in cases in which the curvature of a curve is detected using a camera or the like.

Moreover, the vehicle-in-front image 110 in the first exemplary embodiment, and the vehicle speed image 130 and the level image 132 in the second exemplary embodiment are displayed on the display unit 20 in a state shifted in the same direction as the direction in which the travel path curves. Note that the vehicle-in-front image 110 is information that can inform an occupant of whether or not a vehicle traveling in front has been identified when the cruise control function has been activated. The vehicle speed image 130 and the level image 132 are information that is frequently observed by the occupant in order to ascertain the current speed of the vehicle 12. Namely, in each of these exemplary embodiments, content images including information that is closely watched by the occupant are shifted in the same direction as the direction in which the travel path curves, thereby enabling the gaze of the occupant to be guided in the direction in which the travel path curves.

In the first exemplary embodiment, the two sets of double lines 120 and double lines 122 are each displayed on the display unit 20 in a state curving in the same direction as the direction in which the travel path curves. Specifically, in the first exemplary embodiment, upper portions of the double lines 120 on the liquid crystal screen 22A curve in the same direction as a direction in which the steering wheel 18 is operated, and upper portions of the double lines 122 on the projection screen 24A also curve in the same direction as the direction in which the steering wheel 18 is operated. Thus, in the first exemplary embodiment, the occupant is able to easily recognize that they are passing through a curve on the travel path.

In particular, in the first exemplary embodiment, the double lines 120 and the double lines 122 are configured as a continuation of line segments, and so the curvature of the double lines 120 and the double lines 122 increases in a unified state. Namely, in the line of sight of the occupant seated in the driving seat, the travel path expressed by the double lines 120 and the double lines 122 curves with respect to vehicle image 100 in the same direction as the direction in which the travel path curves. In the display device 10 of the first exemplary embodiment, the occupant can clearly recognize that they are passing through a curve by displaying lines (the double lines 120 and the double lines 122) simulating the travel path over a wide range on the display unit 20.

In the display device 10 of the first exemplary embodiment, display of the double lines 120 and the double lines 122 on the display unit 20 corresponds to activation of the cruise control function of the vehicle 12. Namely, in the display device 10 of the first exemplary embodiment, the occupant can be informed that the vehicle 12 has detected a curve. This enables the occupant to be made to feel at ease.

Note that although the double lines 120 and the double lines 122 simulating the travel path are displayed on the respective displays of the display unit 20 when the cruise control function has been activated in the first exemplary embodiment, there is no limitation thereto. For example, the CPU 32 may display the double lines 120 and the double lines 122 on the respective displays of the display unit 20 when the vehicle 12 is coming into a curve, and may clear the double lines 120 and the double lines 122 from the respective displays of the display unit 20 after the vehicle 12 has passed through the curve. After the double lines 120 and the double lines 122 have been cleared from the respective displays of the display unit 20, the CPU 32 may display the vehicle speed on the liquid crystal screen 22A, or display information such as the temperature or weather on the projection screen 24A.

This enables the gaze of the occupant to be guided when passing through a curve, while enabling other valuable information to be presented to the occupant when not on a curve.

Note that although the CPU 32 changes each of the content images according to the steering angle detected by the steering angle sensor 40 in each of these exemplary embodiments, there is no limitation thereto. For example, position information regarding the vehicle traveling in front as detected based on information acquired from the various sensors by the camera ECU 58 may be reflected in changes to the vehicle-in-front image 110. Alternatively, for example, information relating to the shape of the travel path detected based on information acquired from the various sensors by the camera ECU 58 may be reflected as changes to the lines (the double lines 120 and the double lines 122).

What is claimed is:

1. A control device for a display mounted on a vehicle, the control device comprising:
    a processor configured to:
        display, on the display, a first image that represents the vehicle on which the display is mounted and a second image that represents a travel path of the vehicle in a forward direction of the vehicle; and
        when the travel path of the vehicle curves, change the second image, wherein
    the second image includes a region extending in front of the vehicle in the forward direction of the vehicle, the region bounded by a pair of lines respectively located on left and right sides of the region, the region simulating the travel path of the vehicle,
    the processor changes the second image according to a steering angle of a steering wheel of the vehicle to cause the pair of lines to curve in a same direction as a direction in which the steering wheel is turned, and
    the processor changes a curvature amount of the pair of lines so that as the steering angle of the steering wheel increases, the curvature amount increases,
    the control device further comprising a memory in which is stored a plurality of different second images that vary from each other in curvature amounts and directions of the pair of lines, and wherein
    the processor selects the second image, based on the steering angle of the steering wheel, from the plurality of different second images stored in the memory.

2. The control device of claim 1, wherein the display unit includes: (i) a first display unit that is provided at a meter display; and (ii) a second display unit that is provided at a projection surface of a head-up display, and that is above and adjacent to the first display unit in a line of sight of an occupant of the vehicle, and wherein:
    the processor displays the pair of lines so as to be continuous from the first display unit to the second display unit.

3. The control device of claim 1, wherein the processor causes display of the lines on the display unit in a case in which the vehicle is coming into a curve, and clears the lines from the display unit after the vehicle has passed through the curve.

4. The control device of claim 1, wherein the processor causes display of the lines on the display unit in response to activation of a cruise control function of the vehicle.

5. The control device of claim 1, wherein the first image is displayed on the display unit in a fixed state between the pair of lines.

6. The control device of claim 1, wherein the first image is displayed on the display unit in a fixed state in the region so as to be sandwiched between the pair of lines in a horizontal direction.

7. A control device for a display mounted on a vehicle, the control device comprising:
    a processor configured to:
        display, on the display, a first image that represents the vehicle on which the display is mounted and a second image that represents a travel path of the vehicle in a forward direction of the vehicle; and
        when the travel path of the vehicle curves, change the second image, wherein
    the second image includes a region extending in front of the vehicle in the forward direction of the vehicle, the region bounded by a pair of lines respectively located on left and right sides of the region, the region simulating the travel path of the vehicle,
    the first image is displayed on the display unit in a fixed state in the region so as to be sandwiched between the pair of lines in a horizontal direction,
    the processor causes the pair of lines to curve in a same direction as a direction in which the travel path curves,
    the display unit includes: (i) a first display unit that is provided at a meter display; and (ii) a second display unit that is provided at a projection surface of a head-up display, and that is above and adjacent to the first display unit in a line of sight of an occupant of the vehicle, and
    the processor displays the pair of lines so as to be continuous from the first display unit to the second display unit.

8. The control device of claim 7, wherein the processor changes the second image according to a steering angle of a steering wheel of the vehicle.

9. The control device of claim 7, wherein the processor causes display of the lines on the display unit in a case in which the vehicle is coming into a curve, and clears the lines from the display unit after the vehicle has passed through the curve.

10. The control device of claim 7, wherein the processor causes display of the lines on the display unit in response to activation of a cruise control function of the vehicle.

11. A method of controlling a display mounted on a vehicle, the method executed by a hardware processor and comprising:
    displaying, on the display, a first image that represents the vehicle on which the display is mounted and a second image that represents a travel path of the vehicle in a forward direction of the vehicle; and
    changing the second image when the travel path of the vehicle curves, wherein
    the second image includes a region extending in front of the vehicle in the forward direction of the vehicle, the region bounded by a pair of lines respectively located on left and right sides of the region, the region simulating the travel path of the vehicle,
    the processor changes the second image according to a steering angle of a steering wheel of the vehicle to cause the pair of lines to curve in a same direction as a direction in which the steering wheel is turned,
    the processor changes a curvature amount of the pair of lines so that as the steering angle of the steering wheel increases, the curvature amount increases, and
    the processor selects the second image, based on the steering angle of the steering wheel, from a plurality of different second images stored in a memory, the plurality of different second images that are stored in the memory varying from each other in curvature amounts and directions of the pair of lines.

* * * * *